Victor R. Nelson
INVENTOR

May 27, 1969
V. R. NELSON
3,446,368
MATERIAL TRANSFERRING APPARATUS
Filed Dec. 1, 1966
Sheet 3 of 3
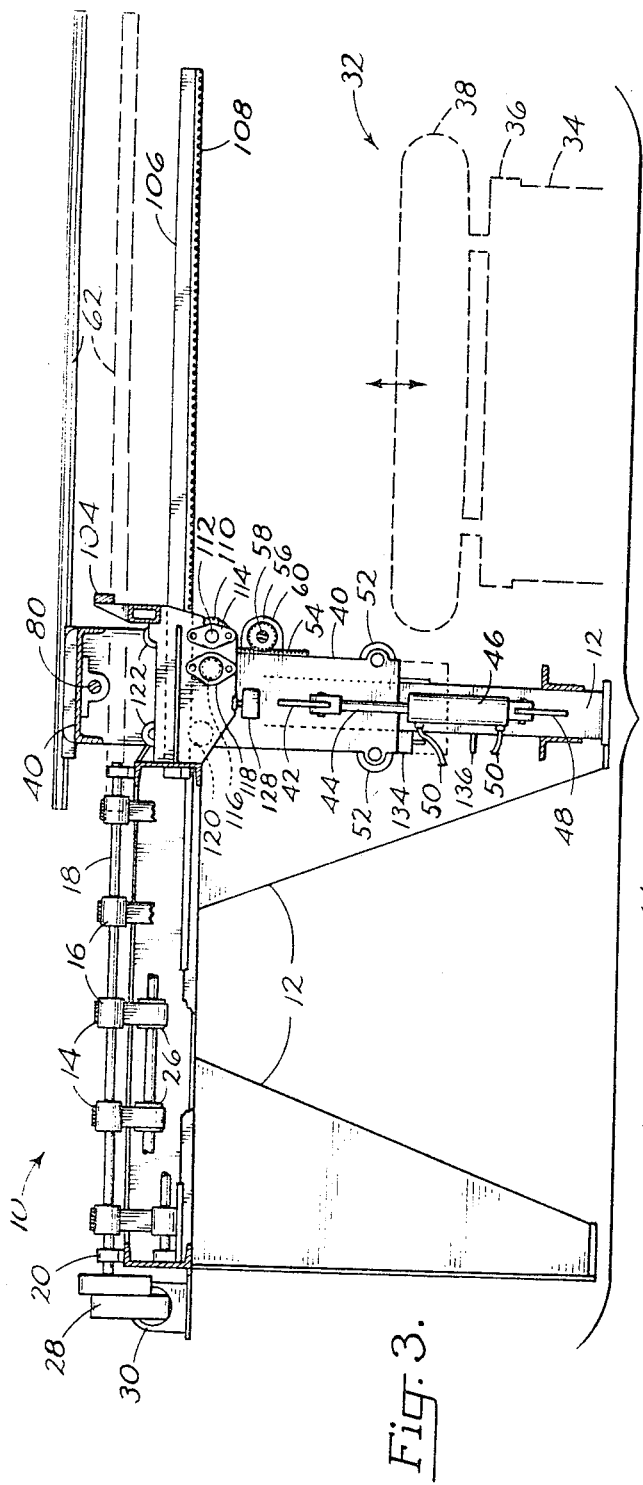
Fig. 3.
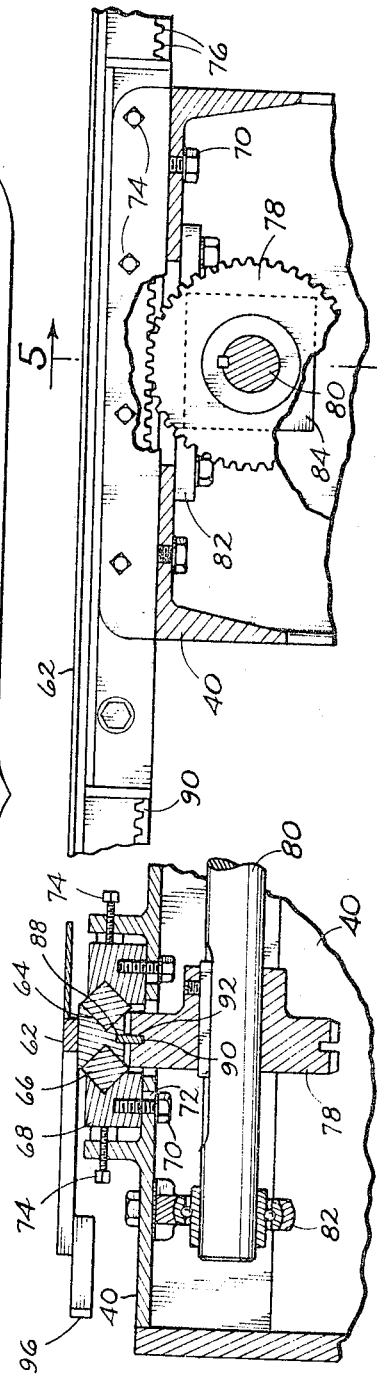
Fig. 4.
Fig. 5.
Victor R. Nelson
INVENTOR
BY Oliver D. Olson
Agent

United States Patent Office 3,446,368
Patented May 27, 1969

3,446,368
MATERIAL TRANSFERRING APPARATUS
Victor R. Nelson, 7710 N. Denver Ave.,
Portland, Oreg. 97217
Filed Dec. 1, 1966, Ser. No. 598,322
Int. Cl. B65g 60/00, 61/00
U.S. Cl. 214—6                         10 Claims

ABSTRACT OF THE DISCLOSURE

The apparatus of this invention includes material supporting means mounted for vertical and horizontal reciprocation in such manner as to move from an initial position underlying material on an infeed support, first vertically upward to elevate the material from the infeed support, then horizontally forward to position the material above a second station, then vertically downward but still above said second station, and finally horizontally rearward to said initial position for underlying subsequently deposited material on the infeed support, this final movement being accompanied by withdrawal of the support means from under the material and deposit of the latter at the second station.

Background of the invention

This invention relates to apparatus for transferring material from one station to another, and more particularly to apparatus for transferring laid up assemblies of veneer to an accumulator preliminary to pressing.

In the manufacture of plywood it has been conventional practice heretofore to assemble the ply layers at a lay-up station, with each subsequent assembly being laid up upon the next preceding assembly until a stack of a desired number of assemblies has been accumulated for transfer to a press. This assembly procedure involves four persons each of whom performs a specified segment of the assembly and then is idle until his task recurs for the next subsequent assembly. Accordingly, this idle time represents a significant cost factor both in labor and in reduced production volume.

Summary of the invention

The present invention achieves the principal objective of providing apparatus which, by the controlled sequential movement of material supporting means, operates efficiently to transfer various types of materials, such a laid up assemblies of veneer, panels of particle board and the like, from one station to a remotely spaced station with speed, facility and precision. Further, the apparatus may perform this operation automatically, without manual attendance, upon arrival of the material at a predetermined position on an infeed support.

When utilized in a plywood production line, the transfer apparatus of this invention achieves the specific objective of enabling the assembly of ply layers at sequential sections of a lay-up station, in a substantially continuous operation, thereby minimizing the aforementioned idle time and increasing production volume to a maximum. The apparatus operates with speed and precision to transfer the loosely arranged assembly of plies to an accumulator without displacing the component plies. Further, the apparatus functions to provide the accumulated stack of assemblies with a squared side for possible use as a reference in subsequent operations.

It is another feature of the present invention that the apparatus may include auxiliary accumulating means which enables the apparatus to continue its transferring operation during delivery of a previously accumulated load on a main accumulator to a subsequent stage of operation.

The features and objectives enumerated hereinbefore are achieved by apparatus which is of simplified construction for economical manufacture, which is adaptable for installation in automated production lines, and which is capable of long and faithful operation with a minimum of maintenance and repair.

The foregoing and other objects and advantages of the present invention will appear hereinafter from the detailed description of the preferred embodiment illustrated in the accompanying drawings.

Brief description of the drawings

FIG. 3 is a sectional view taken on the line 3—3 in FIG. 2, a vertically adjustable accumulator being illustrated in dotted lines.

FIG. 4 is a fragmentary sectional view taken on the line 4—4 in FIG. 1.

FIG. 5 is a fragmentary sectional view taken on the line 5—5 in FIG. 4.

Description of the preferred embodiment

Figure 1:
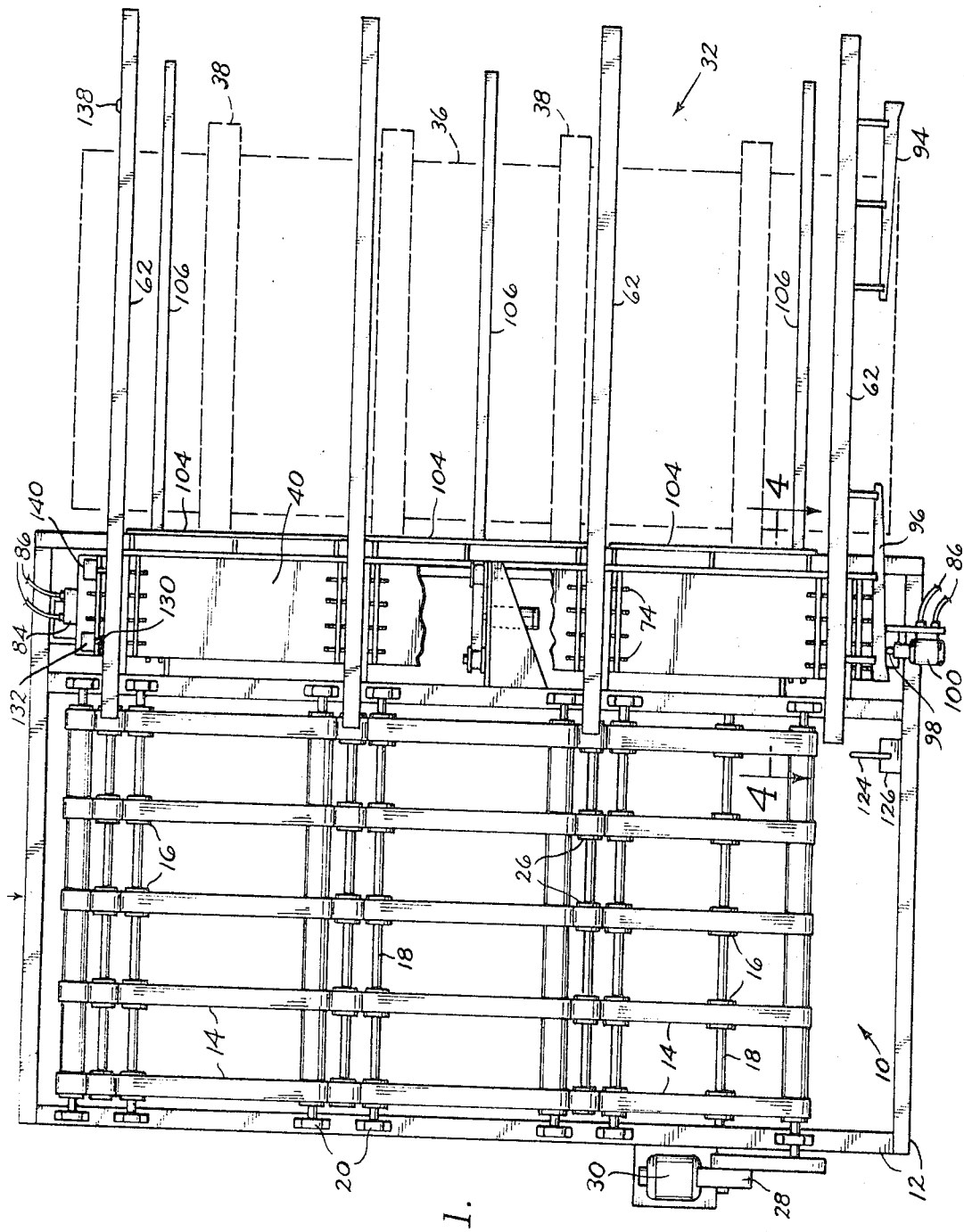
FIG. 1 is a plan view of transfer apparatus embodying the features of the present invention and shown in association with an accumulating station depicted in dash lines for illustrating its use in transferring laid up veneer assemblies from a lay-up station, not shown.

The transfer apparatus of the present invention includes infeed support means 10 for supporting material delivered from a preceding station. In the illustrated embodiment the preceding station is a veneer lay-up station located adjacent the upper left hand portion of the apparatus illustrated in FIG. 1 and from which the laid up veneer assemblies progress in the direction of the arrow onto the infeed support means.

In the embodiment illustrated the infeed support means comprises a plurality of laterally spaced conveyors mounted on a supporting framework 12. Each conveyor includes an endless belt the working stretch 14 of which overlies longitudinally spaced rolls 16. The rolls are secured for rotation with the shafts 18 journaled in bearings 20 mounted on the framework. The lower stretch 22 of the belt is trained under guide rolls 24.

For purposes explained more fully hereinafter, intermediate portions of the working stretch 14 of the conveyor belt are trained under intermediate guide rolls 26 positioned between and below adjacent pairs of supporting rolls 16. The working stretch of the belt thus is divided into longitudinal sections.

The projecting end of one of the roll supporting shafts 18 is connected to the output shaft of a gear reduction unit 28, the input of which is connected to the driven shaft of an electric motor 30 supported on the framework.

The apparatus also includes means for transferring material deposited on the infeed support means 10 to a second station 32 which, in the embodiment illustrated, comprises a veneer lay-up accumulator. The accumulator illustrated in dotted lines in FIGS. 1 and 3 is of conventional construction, and comprises a framework 34 mounted for movement along a track (not shown) and supporting a vertically adjustable platform 36 carrying a plurality of spaced conveyors 38.

The transfer means illustrated includes a U-shaped frame 40 disposed adjacent the infeed support means for vertical movement relative to the conveyor belts 14 and framework 12. For this purpose a projecting lug 42 on each of the depending legs of the frame pivotally connects the projecting end of a piston rod 44 secured at its inner end to a piston reciprocative in an elongated cylinder 46. The end of the cylinder opposite the piston rod is mounted pivotally on a lug 48 projecting from a leg member of the framework 12. Hydraulic fluid under pressure is supplied selectively to opposite ends of the cylinder through lines 50 for reciprocating the piston and correspondingly moving the frame 40 vertically. Guide rollers 52 on the frame legs engage tracks on opposite sides of the framework legs, to guide the frame through its vertical movement.

Means is provided for insuring simultaneous and equal movement of the spaced legs of the frame 40, to avoid binding between the frame and framework. In the embodiment illustrated, this means is provided by a vertically elongated rack 54 secured to each frame leg. Engaging the teeth of each rack is a gear 56, and the pair of gears are interconnected for simultaneously rotation with the shaft 58 supported in bearings 60 projecting from the spaced legs of the framework 12.

The upper end of the frame 40 supports a plurality of elongated, laterally spaced fork members 62 for longitudinal reciprocative movement relative to the frame. Thus, referring particularly to FIGS. 4 and 5 of the drawings, each fork member is provided with longitudinally extending grooves 64 in its opposite sides, and these grooves receive slidably therein the pair of laterally spaced guide shoes 66. The shoes are made of oil impregnated bronze or other suitable material providing a lubricated surface engaging the grooves. A preferred material for this purpose is the synthetic thermoplastic resin known in the trade as Nylatron. The supporting guide shoes in turn are mounted in the grooved sides of the mounting blocks 68 supported upon the frame. Securing bolts 70 engage the blocks and extend through elongated openings 72 in the frame for adjustment toward and away from each other by the adjustment screws 74 threaded in lugs projecting from the frame.

The underside of each fork member is provided with teeth 76 which engage a drive gear 78 secured for rotation with the shaft 80 journaled in bearings 82 mounted on the frame. An extending end of the shaft is connected to the output shaft of a rotary hydraulic motor 84 mounted on the frame. Reversible operation of the motor is afforded by appropriate connection of hydraulic lines 86 to a source of hydraulic fluid under pressure through directional valving.

Thus, the elongated forks are operable between a retracted position traversing the conveyor belts 14 of the infeed support means and an extended position, shown in the drawings, overlying the accumulator at the second station 32.

Since the apparatus of the present invention is designed to transfer such material as laid up assemblies of veneer which comprise rough and warped sheets, means is provided for preventing jamming of the teeth 76 of the fork members by projecting portions of the veneer. In the embodiment illustrated (FIGS. 4 and 5), a longitudinal groove 88 in the underside of each fork member traverses the teeth. An elongated bar 90 is anchored in said groove by such means as a press fit, and projects downwardly below the teeth sufficiently to engage and prevent projecting portions of veneer from entering the teeth. The drive gear 78 associated with each fork member is provided with an annular groove 92 in which the bar is received.

Means also preferably is provided for decreasing the speed of movement of the fork members progressively as they approach the opposite ends of their travel, in order to prevent displacement of material carried upon them. In the embodiment illustrated (FIG. 1), such means is provided by the pair of elongated cam members 94 and 96 supported one adjacent each of the opposite ends of one of the fork members. The outer edges of the cam members are disposed for engagement with the control plunger 98 of a throttling valve 100 in the hydraulic lines 86 of the reversible motor 84. The outer edges of the cam members project angularly outward from the longitudinal center line of the fork member, in the direction of the opposite ends of the latter. Thus, as the fork member moves from one of its limits toward its other limit, it first increases in speed gradually to a substantial constant maximum speed and thereafter decreases in speed gradually as it approaches said other limit. In this manner the material carried upon the fork members is not displaced relative to the fork members.

Figure 2:
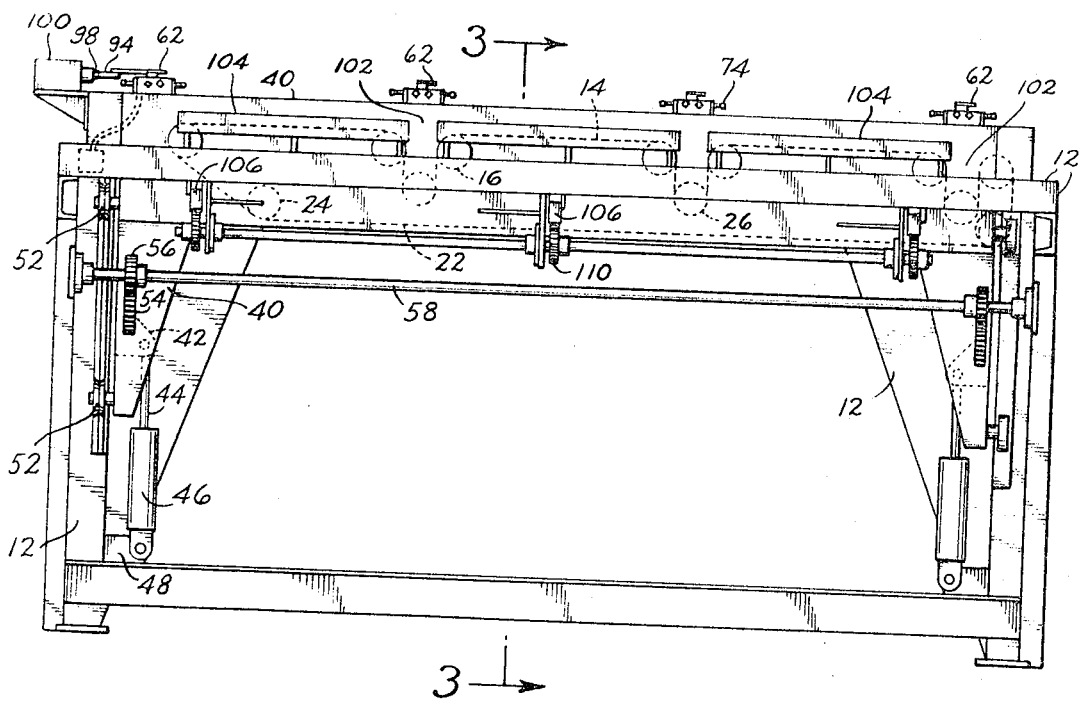
FIG. 2 is an end elevation as viewed from the left in FIG. 1.

As best illustrated in FIG. 2, the three spaced forks toward the right are positioned in vertical alignment with the space 102 between adjacent sections of the working stretches 14 of the conveyor belts, and the fork at the left side is positioned outward of the left end of the adjacent conveyor section. In this manner, when the fork members are retracted to their position traversing the conveyor belts, they may move vertically with the frame 40 between a retracted position in which they are positioned below the plane of the working stretches of the conveyor sections, to underlie a laid up veneer assembly deposited on the infeed support means, and an extended position above said working stretches to lift the laid up veneer assembly from the latter.

With the fork members elevated above the working stretches 14 of the conveyors, the hydraulic motor 84 is operated to move the fork members to the extended position (FIG. 3) projecting from the infeed support means 10 and overlying the accumulator 32. The frame supporting cylinders 46 then are operated to move the frame downward to the position at which the projecting fork members are disposed in the dash line position illustrated in FIG. 3, below the plane of the working stretches 14 of the conveyors. The hydraulic motor then is reversed to retract the fork members to the position traversing the conveyor belts of the infeed support means. As the fork members move to this retracted position the inboard edge of the veneer lay-up assembly is brought into abutment with the spaced stop members 104 supported upon a member of the framework 12. These stop members are positioned below the upwardly extended position of the fork members and are arranged to intercept the path of movement of material on the fork members when the latter are in their downward retracted position. In this latter position, therefore, the laid up veneer assembly is held by the stop members as the fork members retract toward the infeed support means, and thus is deposited upon the accumulator.

Further, it is by means of the fixed stop members 104 that subsequent laid up veneer assemblies are stacked one upon another on the accumulator with their inboard edges aligned vertically. This alignment of one edge of the assemblies in the accumulated stack provides a convenient reference edge for subsequent operations.

Auxiliary accumulator means also may be provided in the apparatus of the present invention for accumulating veneer lay-up assemblies during the period of time that the accumulator 32 is transferring a stack of assemblies to a subsequent station, for example a prepress. In the embodiment illustrated (FIG. 3), this auxiliary accumulator comprises a plurality of spaced elongated support arms 106 disposed substantially parallel to the fork members and below the downwardly retracted position of the latter. The underside of each support arm is provided with teeth 108 which engage the driven gear 110. These driven gears are secured for rotation with the shaft 112 journaled in bearings 114 mounted on the framework 12. One of the driven gears meshes with a drive gear 116 secured to the output shaft of the hydraulic rotary motor 118 which is connected through suitable valving to a source of hydraulic fluid under pressure for reversible operation. The support arms thus are movable between a retracted position traversing the infeed support means 10 and an extended position overlying the normal position of the main accumulator 32 and underlying the extended position of the fork members projecting from the infeed support means.

The support arms are stabilized for reciprocative movement by means of the idler gear 120 meshing with the teeth 108, and the guide rollers 122 engaging the upper surface of the arm.

Means preferably is provided for operating the components of the apparatus automatically to transfer material from the infeed support means 10 to the second station 32. Thus, in the embodiment illustrated, a laid up veneer assembly moves forwardly along the conveyors 14 until its leading end abuts the projecting actuator finger 124 of a microswitch 126 in the electric circuit of a solenoid actuated valve in the hydraulic line 50 delivering hydraulic fluid under pressure to the lower end of the cylinders 46. The frame 40 thus is moved upward, carrying with it the fork members 62 which previously had been retracted to the position traversing and underlying the working stretches 14 of the conveyor belts and underlying the laid up veneer assembly supported thereon. The latter thus is supported upon the fork members and elevated above the infeed support means.

Upon movement of the frame 40 to the upwardly extended position of the fork members, the actuating finger of a microswitch 128 carried by the frame 40 engages a stop on the fixed framework 12 and completes the electric circuit of a solenoid valve in the hydraulic line 86 supplying fluid under pressure to the motor 84 to drive the latter in the direction to extend the fork members to the position projecting from the infeed support means 10. Thereupon, a projection 130 (FIG. 1) on one of the fork members engages the actuating finger of a microswitch 132 mounted on the frame, to complete the electric circuit of a solenoid valve in the hydraulic line 50 supplying fluid under pressure to the upper end of the cylinder 46. The frame 40 thereupon is retracted downward, moving the projecting fork members downward to the dash line position illustrated in FIG. 3.

In the downward position of the frame the actuating finger of a microswitch 134 supported by the frame engages the stop 136 carried by the framework, thereupon completing the electric circuit of a solenoid valve in the hydraulic line 86 delivering fluid under pressure to the motor 84 to drive the latter in the direction to retract the fork members to the position traversing the infeed support means 10. Upon retraction of the fork members, a projection 138 on one of them engages the actuating finger of a microswitch 140 in the same electric circuit as the microswitch 126 operated by the leading end of a laid up veneer assembly. Thus, until a subsequent laid up veneer assembly is brought into proper position on the infeed support means, the fork members are retained in the normal rest position traversing and underlying the working stretches 14 of the conveyors.

If desired for automation, a conventional electrical counter type switch may be used in the electric circuit of a solenoid valve controlling the reversible operation of the hydraulic motor 118, to extend the support arms 106 after the fork members 62 have cycled a predetermined number of times to accumulate on the accumulator 32 a stack of a desired number of ply assemblies.

It will be understood that as each ply assembly is deposited upon the accumulator the latter is retracted downward in stepwise manner to accommodate each subsequent deposit. Initially the supporting surface of the accumulator is elevated to a position slightly below the downwardly retracted position of the fork members.

It will be apparent to those skilled in the art that various changes may be made in the structural details described hereinbefore. For example, the infeed support means 10 may take the form of a table top, rather than the movable conveyor assembly illustrated. In such event the table top is provided with spaced grooves dividing the table top in sections, to accommodate retracting the fork members below the supporting surface thereof to underlie material deposited upon the table top.

For the transfer of material such as hardboard or particle board, which is more rigid than laid up veneer assemblies, only two fork members may be required, with a single infeed support disposed between the spaced forks.

The hydraulic cylinders and motors may be replaced by electric motors or other suitable drive means, as desired, and their sequential control may be achieved by such means as conventional multiple contact electrical timers.

The transfer fork assembly may be positioned adjacent the leading end of the infeed support means, rather than to the side thereof as illustrated. However, when used with laid up veneer assemblies, the illustrated side shift arrangement is preferred because the travel of the fork members is minimized in the widthwise direction of the assemblies.

The foregoing and other changes may be made without departing from the spirit of this invention and the scope of the appended claims.

Having now described my invention and the manner in which it may be used, what I claim as new and desire to secure by Letters Patent is:

1. Apparatus for transferring veneer and like material from a first station to a second station spaced therefrom, comprising
   (a) infeed support means for supporting material received from the first station,
   (b) at least two elongated transfer fork members spaced apart horizontally transversely of their length with the infeed support means disposed between them,
   (c) means mounting the fork members for vertical movement between a retracted position below the supporting plane of the support means and an extended position above the supporting plane of the support means,
   (d) means mounting the fork members for longitudinal movement horizontally between a retracted position traversing the support means and an extended position projecting from the support means, said mounting means including laterally spaced guide shoes slidably engaging longitudinal grooves in opposite sides of each fork member, and means supporting the guide shoes for lateral adjustment relative to the fork member, and
   (e) drive means operatively associated with said mounting means for moving the fork members sequentially from the said positions of retraction first to the extended position above the supporting plane of the support means for lifting material from the latter, then to the extended position projecting from the support means for moving the material to a position above the second station, then to the retracted position below the supporting plane of the support means and then to the retracted position traversing the support means for transferring the material to the second station and for underlying subsequently deposited material on the support means.

2. Apparatus for transferring veneer and like material from a first station to a second station spaced therefrom, comprising
   (a) infeed support means for supporting material received from the first station,
   (b) a fixed supporting framework,
   (c) a movable frame mounted on the framework for vertical reciprocation,
   (d) at least two elongated transfer fork members spaced apart horizontally transversely of their length with the infeed support means disposed between them,
   (e) means mounting the fork members on the movable frame for vertical movement therewith and for longitudinal movement horizontally between a retracted position traversing the support means and an extended position projecting from the support means,
   (f) first drive means interengaging the framework and movable frame for reciprocating the latter vertically relative to the framework, and (g) second drive means interengaging the movable frame and fork members for reciprocating the latter horizontally relative to the movable frame, (h) the first and second drive means operating to move the fork members sequentially from the said position of retraction first to the extended position above the supporting plane of the support means for lifting material from the latter, then to the extended position projecting from the support means for moving the material to the position above the second station, then to the retracted position below the supporting plane of the support means and then to the retracted position traversing the support means for transferring the material to the second station and for underlying subsequently deposited material on the support means, and (i) material abutment means on the fixed framework arranged to engage and remove material from the fork members during said last mentioned retraction movement of the latter.

3. The apparatus of claim 2 wherein the fixed framework is positioned adjacent the infeed support means and the means mounting the fork members on the movable frame for horizontal movement affords movement of the fork members alternately to extended positions beyond the opposite sides of the movable frame.

4. The apparatus of claim 2 wherein the infeed support means includes spaced support sections with each section disposed between a pair of fork members.

5. The apparatus of claim 2 wherein the infeed support means comprises movable conveyor means including spaced conveyor sections with each section disposed between a pair of fork members.

6. The apparatus of claim 2 wherein the means mounting the fork members on the movable frame for longitudinal movement includes laterally spaced guide shoes on the movable frame slidably engaging longitudinal grooves in opposite sides of each fork member, and means supporting the guide shoes for lateral adjustment relative to the fork member.

7. The apparatus of claim 2 wherein the material abutment means is positioned below the fork members in their extended position above the support means for accommodating transfer of material from the support means to a position above the second station, the abutment means also being positioned above the fork members in their retracted position below the support means for intercepting material on the fork members during retraction of the latter for transferring the material to the second station.

8. The apparatus of claim 2 including material accumulator means comprising at least two elongated arm members disposed below the fork members in their retracted position below the supporting surface of the support means, and means mounting the arm members on the fixed framework for longitudinal movement horizontally between a position extending over the second station and a position retracted therefrom.

9. The apparatus of claim 2 wherein the second drive means for moving the fork members horizontally comprises a reversible motor operatively engaging the fork members for moving the latter, speed control means associated with the motor, and speed control operator means mounted for movement with the fork members and operable at the terminal end portions of travel of the latter to reduce the speed of movement progressively as the fork members approach said ends of travel.

10. The apparatus of claim 9 wherein the reversible motor comprises a fluid pressure motor connected to a source of fluid under pressure, the speed control means comprises a fluid pressure control valve between the motor and fluid pressure source, and the speed control operator means comprises cam means engaging the control valve for adjusting the latter during movement of the fork members.

References Cited

UNITED STATES PATENTS

| | | |
|---|---|---|
| 1,556,695 | 10/1925 | Kronborg. |
| 1,569,033 | 1/1926 | Reichel. |
| 2,930,493 | 3/1960 | Sundblad et al. |
| 3,130,839 | 4/1964 | Grasvoll. |
| 3,169,646 | 2/1965 | Mason. |
| 3,195,739 | 7/1965 | Hein et al. |
| 2,784,852 | 3/1957 | Strauss et al. _____ 214—16.1 |

GERALD M. FORLENZA, *Primary Examiner.*

ROBERT J. SPAR, *Assistant Examiner.*